United States Patent [19]

Yamashita et al.

[11] 3,835,593
[45] Sept. 17, 1974

[54] APPARATUS FOR DISPLACING GRINDING SURFACE OF THROW-AWAY TIP

[75] Inventors: Junnosuke Yamashita; Hideo Negishi, both of Tokyo, Japan

[73] Assignee: Mitsubishi Kinzoku Kogyo Kabushiki Kaisha, Tokyo-to, Japan

[22] Filed: Nov. 17, 1972

[21] Appl. No.: 307,632

[30] Foreign Application Priority Data
Nov. 20, 1971  Japan.................. 46-92728

[52] U.S. Cl............... 51/216 ND, 51/230
[51] Int. Cl............................ B24b 41/06
[58] Field of Search........ 51/215 R, 215 CP, 215 H, 51/216 ND, 216 H, 131, 225, 230

[56] References Cited
UNITED STATES PATENTS
2,603,042  7/1952  Moxley.................. 51/216 ND
2,772,521  12/1956  Voytech.................. 51/131 X
2,884,747  5/1959  Lehman.................. 51/215 H
3,393,475  7/1968  Smith.................. 52/225 X
3,665,656  5/1972  Newsome.................. 51/215 H

*Primary Examiner*—Al Lawrence Smith
*Assistant Examiner*—Marc R. Davidson
*Attorney, Agent, or Firm*—Wenderoth, Lind & Ponack

[57] ABSTRACT

Apparatus for displacing grinding surfaces of a throw-away tip provided on the grinding table of a grinding machine having as its principal components: a feeding arm, an indexing pawl, and pushing device, all being inter-related to carry forward and backward as well as to place the throw-away tip between and at the feeding and grinding positions by the reciprocating movement of the feeding arm.

7 Claims, 4 Drawing Figures

APPARATUS FOR DISPLACING GRINDING SURFACE OF THROW-AWAY TIP

BACKGROUND OF THE INVENTION

1. Field of the Invention

This invention relates to an apparatus for displacing grinding surfaces of a throw-away tip. More particularly, it is concerned with the apparatus for displacing the grinding surface of a throw-away tip of a construction, wherein a feeding arm and an indexing pawl are provided on the upper surface of the grinding table for carrying out the grinding work on the surface of the throw-away tip such as providing chip breaker or negative land, or removing corner surface, etc., by which the untreated surface of the throw-away tip is displaced by an automatic operation and continuously forwarded to the working position on the grinding table.

2. Discussion of Prior Arts

Heretofore, in grinding operations on the surface of a throw-away tip such as provision of a chip breaker or a negative land, or removal of corner surface, etc., an indexing device which is capable of indexing the same number as that of the outer peripheral surfaces of the throw-away tip has been used to displace the grinding surface of the tip. However, this device has unavoidable defects such that longer time and much labor are required, whereby grinding efficiency of the grinding apparatus is inevitably lowered. The reasons for this are as follows: in order to accurately maintain the throw-away tip at the center of rotation of the indexing device, a particular fitting jig is required in accordance with the shape and size of the tip, the maintenance and control of which are therefore highly troublesome; and fluctuations in the sizes of the inscribed circle and thickness of the throw-away tip directly affect the working precision thereof, in particular, when high precision in the grinding work is required, adjustment operation should be carried out to increase accuracy in the working position of the throw-away tip.

SUMMARY OF THE INVENTION

It is therefore an object of the present invention to provide an improved construction of the apparatus for displacing the grinding surface of the throw-away tip free from the abovementioned defects.

It is another object of the present invention to provide apparatus for displacing the grinding surface of the throw-away tip which is capable of carrying out the required grinding operation in an easier and quicker manner by continuously displacing the outer peripheral surfaces of the throw-away tip.

The above objects as well as operations of the apparatus according to the present invention will become more apparent from the following detailed uescription of the invention when read in conjunction with the accompanying drawing.

DETAILED DESCRIPTION OF THE INVENTION

Figure 1:
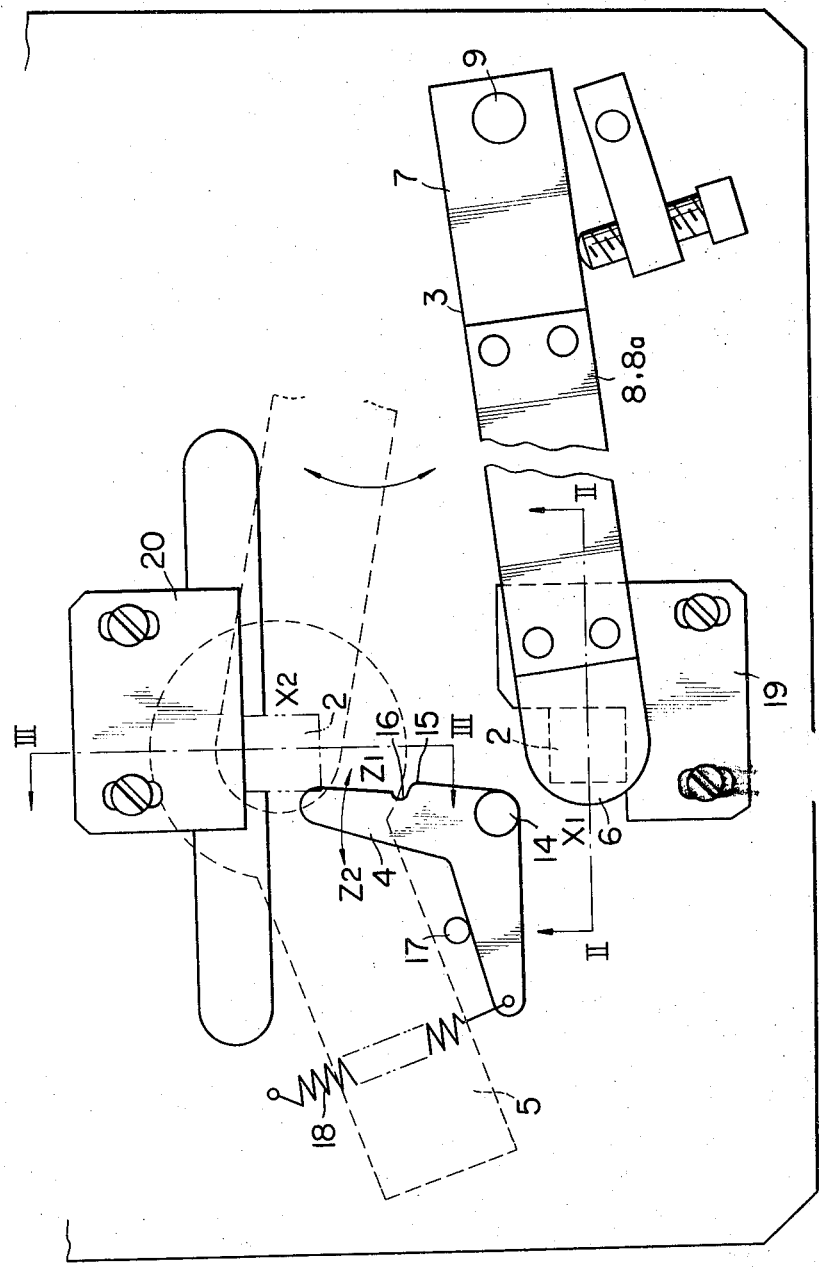
FIG. 1 is a plan view showing the apparatus for displacing the grinding surface of a throw-away tip according to the present invention.

Referring now to FIG. 1 of the drawing which indicates a preferred embodiment of the present invention, the apparatus for displacing the grinding surface of the throw-away tip which is provided on the upper surface of a grinding table (1) to carry out the grinding work on the surface of the throw-away tip is constructed with a feeding arm (3) to forward a throw-away tip (2) from its feeding position ($X_1$) to a grinding position ($X_2$) thereof; an indexing pawl (4) to displace only one surface of the outer peripheral surfaces of the throw-away tip (2) in the course of its being returned from its grinding position ($X_2$) to its feeding position ($X_1$); and a pusher (5) to pressfix, from an upper position, the throw-away tip which has been forwarded to its grinding position together with the feeding arm (3). The thus constructed apparatus is operated automatically to continuously displace the outer peripheral surfaces of the throw-away tip to forward the untreated surface thereof to its grinding position ($X_2$).

Figure 2:
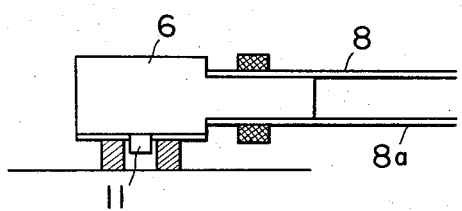
FIG. 2 is a cross-sectional view of the apparatus as shown in FIG. 1 at a portion cut along the line II—II.
Figure 3:
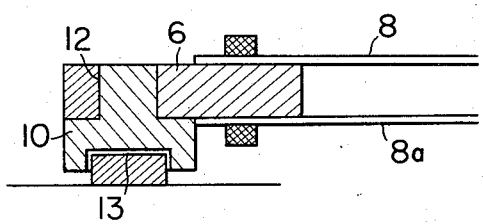
FIG. 3 is a cross-sectional view similar to FIG. 2 but showing another embodiment of the apparatus according to the present invention.

The feeding arm (3) is so formed that a front part (6) and a rear part (7) are connected by leaf springs (8, 8a) with allowance to make slight up-and-down movement, and the rear end thereof is pivotally fixed with a pin (9). Further, the front part (6) is provided with a holding part or holder (10) to confine the throw-away tip at a definite position. In case a throw-away tip having a center hole is to be held, a protrusion (11) is provided at the lower surface of the front part (6) which is inserted into the center hole of the tip and maintains it in a freely rotatable manner as shown in FIG. 2. In case of holding a throw-away tip without the center hole, an upper portion of the holder (10) is inserted and held rotatably in a hole (12) provided in the front part (6), and, at the same time, a recessed portion (13) is formed in the lower surface of the holder, into which the throw-away tip is inserted and held.

The rotational operation of the feeding arm (3) is done manually or by an actuating mechanism utilizing hydraulic pressure, etc., and the holding and removing works of the throw-away tip placed in the feeding position ($X_1$) are conducted by moving the front part (6) up and down by utilizing the elastic force of the leaf springs (8, 8a). Reciprocating movement of the feeding arm (3) can also be done linearly.

The indexing pawl (4) consists of a main body formed in the shape of a letter "L." The angled portion at the center of the main body is pivotally fixed with a pin (14), and a shoulder (15) and a recess (16) are provided on this pawl at the side of passage of the throw-away tip (2). Also, in order to restrict the pawl (4) to rotate in the direction ($Z_1$) on the pivot of the abovementioned pin (14), a stopper (17) is provided at the rear part of the pawl on the opposite side where the shoulder (15) and recess (16) are formed. A constant spring force is exerted in the direction ($Z_1$) by a spring (18) provided at the rear end of the pawl (4).

The pusher (5) is provided just above the grinding position ($X_2$), and, when the throw-away tip held by the feeding arm (3) is forwarded to the grinding position ($X_2$) and set at the predetermined position, the pusher comes down onto the throw-away tip (2) and the feeding arm (3) to press-fix both. The up-and-down movement of the pusher (5) can be conducted by screw-rotation or by an actuating mechanism such as a hydraulic cylinder.

In order to further achieve accurate positioning for feeding and grinding of the throw-away tip, positioning stoppers (19, 20) are respectively provided with respect to the feeding position ($X_1$) and the grinding position ($X_2$).

The operations of the apparatus according to the present invention will now be described hereinbelow.

Figure 4:
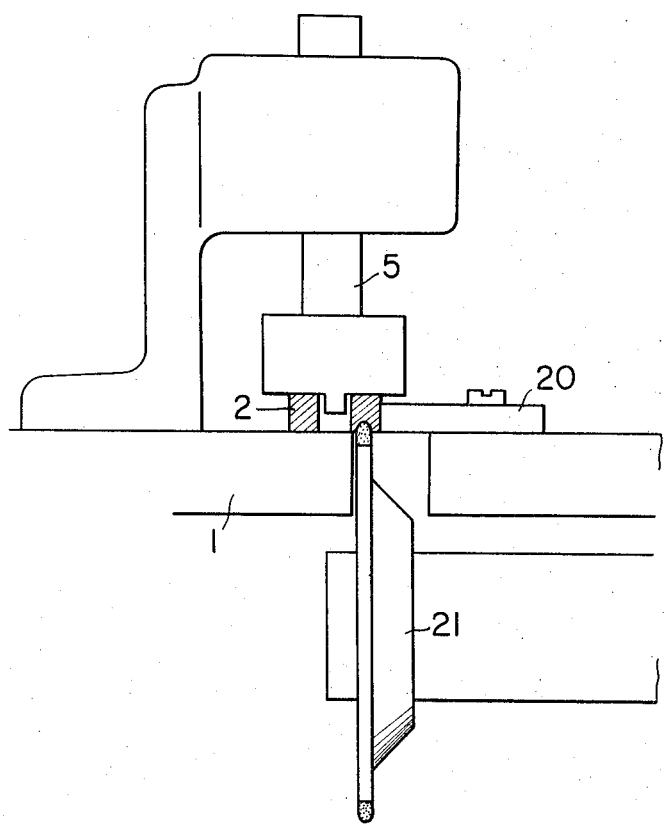
FIG. 4 is a cross-sectional view of the apparatus as shown in FIG. 1 above at a portion cut along the line III—III.

As soon as the throw-away tip (2) positioned to the stopper (19) at the feeding position ($X_1$) is inserted into the holder (10) of the feeding arm (3), the arm begins to move, and carries the throw-away tip to the grinding position ($X_2$). The throw-away tip, held in a freely rotatable manner, moves to the grinding position ($X_2$), while maintaining constant contact with the indexing pawl (4), so that it can reach the grinding position ($X_2$) in its original state in which it was positioned at the feeding position ($X_1$). When the grinding position ($X_2$) of the throw-away tip (2) is determined by the stopper (20), the pusher (5) comes down to press-fix both feeding arm (3) and throw-away tip (2). Subsequently, the grinding wheel 21 provided in and below the grinding table (1) commences operation to conduct the required grinding work as shown in FIG. 4. When the grinding work is finished the pusher (5) moves upward, and the feeding arm (3) which has been released from confinement at the grinding position ($X_2$) begins to go back to the feeding position ($X_1$). At the time when the feeding arm (3) returns to the feeding position ($X_1$) from the grinding position ($X_2$), a corner of the throw-away tip (2) collides with the shoulder (15) provided in the middle portion of the indexing pawl (4), whereby it is prevented from further moving. Since the indexing pawl (4) is prevented from moving to the direction ($Z_1$) by the stopper (17), the throw-away tip held in a freely rotatable manner begins rotational movement on the shoulder (15) with the result that the tip rotates for only one surface and returns to the feeding position ($X_1$), while being restricted its rotation by the side surface of the indexing pawl (4), and finally stops at the position of the stopper (19).

By repetition of the foregoing reciprocating movement, the untreated surface of the throw-away tip can be continuously displaced for required surface grinding works. Incidentally, feeding of the throw-away tip may be done periodically in manual operation, or automatically by a feeding device to be provided at the feeding position ($X_1$).

As described in the foregoing, the apparatus for displacing the grinding surface of the throw-away tip according to the present invention possesses various advantageous features such that, once the throw-away tip (2) is positioned at the feeding position ($X_1$), it continuously displaces the grinding surfaces of the tip until all the untreated surfaces of the tip will have been completely ground, so that the efficiency in the grinding work remarkably improves in comparison with the known operations such as indexing, etc., and that, as the grinding position ($X_2$) can be accurately maintained by both stopper (20) and feeding arm (3), any grinding work requiring high precision can be carried out very quickly.

Further, any throw-away tip of polygonal shape can be displaced by the apparatus according to the present invention only by partially changing the shape of the holder (10) to be fitted at the front part of the feeding arm (3) and the shape of the indexing pawl (4), so that great contribution can be assessed to the effect of the grinding operations such as providing chip breaker or negative land, or removing the corner surface, etc. on the surface of the tip.

What we claim is:

1. An apparatus for angularly displacing a polygonal workpiece having side surfaces and corner edges to successively present different surfaces of the workpiece to working means, said apparatus including workpiece feeding means, workpiece holding means positioned on said workpiece feeding means for rotatably supporting said workpiece, said feeding means and holding means adapted to be reciprocally moved between a retracted feeding position and an advanced working position to transfer the workpiece between said positions along a transfer path, indexing means positioned for engaging the workpiece carried on said feeding means to angularly displace the workpiece in connection with the movement of said feeding means to the retracted feeding position, and means to lock the workpiece carried by said workpiece holding means when the feeding means is in its working position, wherein the improvement comprises: said indexing means being comprised of a pivoted lever (4) located intermediately along said transfer path between said feeding and working positions and having an arm with a free end directed toward said working position and with one side edge thereof normally extending parallel to said transfer path at a location to slidingly contact one side surface of said workpiece (2) being transferred from said feeding position to said working position, stop means (17) positioned adjacent said pivoted lever for preventing said arm from swinging toward said transfer path beyond said normally extending location of said one side edge, resilient means (18) connected to said pivoted lever for urging said arm so that its one side edge is positioned at said normally extending location, said arm having a recess (16) in said one side edge thereof and an abutment shoulder (15) on said edge, said abutment shoulder operating to abut one edge of said workpiece being transferred from said working position to said feeding position to cause said workpiece to be angularly displaced during the course of its transfer to its retracted position, said arm being swung away from said transfer path against the force of said resilient means to allow the workpiece to be angularly displaced after the workpiece has been engaged with said abutment shoulder.

2. The improvement as claimed in claim 1, further including a first positioning stopper (19) located at said feeding position for accurate positioning of the workpiece and a second positioning stopper (20) located at said working position for accurate positioning of the workpiece.

3. The improvement as claimed in claim 1 wherein said lever (4), has an L-shape and is pivotally mounted at the junction of two arms of the L-shaped structure, the second arm engaging said stopper means and being connected to said resilient means.

4. The improvement as claimed in claim 1 further including a table (1) slidably supporting the workpiece thereon and wherein all of said workpiece feeding means, indexing lever, stopper means and resilient means are mounted thereon.

5. An apparatus for angularly displacing a polygonal workpiece having side surfaces and corner edges to successively present different surfaces of the workpiece, comprising:

a table slidably supporting said workpiece thereon;

workpiece feeding means mounted on said table, said workpiece feeding means being comprised of a swingable arm having a rear part pivotally mounted on said table, a distal front part, and resilient means connecting said distal front part and said rear part, said workpiece feeding means adapted to reciprocally move between a retracted feeding position and an advanced working position to transfer the workpiece between said positions along a transfer path;

workpiece holding means positioned on the distal front part of said workpiece feeding means for rotatably holding said workpiece;

indexing means for engaging the workpiece carried on said feeding means to angularly displace the workpiece in connection with the movement of said feeding means to the retracted feeding position, said indexing means being comprised of a pivoted lever (4) located intermediately along said transfer path between said feeding and working positions and having an arm with a free end directed toward said working position and with one side edge thereof normally extending parallel to said transfer path at a location to slidingly contact one side surface of said workpiece (2) being transferred from said feeding position to said working position, stopper means (17) positioned adjacent said pivoted lever for preventing said arm from swinging toward said transfer path beyond the normally extending position of said one side edge, resilient means (18) connected to said pivoted lever for urging said arm so that its one side edge is positioned at the normally extending location, said arm having a recess (16) in said one side edge thereof and an abutment shoulder (15) on said edge, said abutment shoulder operating to abut one edge of said workpiece being transferred from said working position to said feeding position to cause said workpiece to be angularly displaced during the course of its transfer to its retracted position, said arm being swung away from said transfer path against the force of said resilient means to allow the workpiece to be angularly displaced after the workpiece has been engaged with said abutment shoulder; and means to lock the workpiece carried by said workpiece holding means when the feeding means is in its working position.

6. The apparatus as claimed in claim 5 wherein said workpiece holding means includes a protrusion (11) extending therefrom and adapted to engage in a center hole provided in the workpiece to hold said workpiece in a freely rotatable manner.

7. The apparatus as claimed in claim 5 wherein said workpiece holding means has a recess (13) in which said workpiece is held in a freely rotatable manner.

* * * * *